Feb. 21, 1933.  D. B. PERRY  1,898,496
INTERNAL-EXTERNAL FLEXIBLE COUPLING
Filed April 26, 1929   3 Sheets-Sheet 1

INVENTOR
David B. Perry
BY
Synnestvedt & Lechner
ATTORNEYS

Feb. 21, 1933.  D. B. PERRY  1,898,496
INTERNAL-EXTERNAL FLEXIBLE COUPLING
Filed April 26, 1929   3 Sheets-Sheet 2

INVENTOR
David B. Perry
BY
Lynnestvedt + Lechner
ATTORNEYS

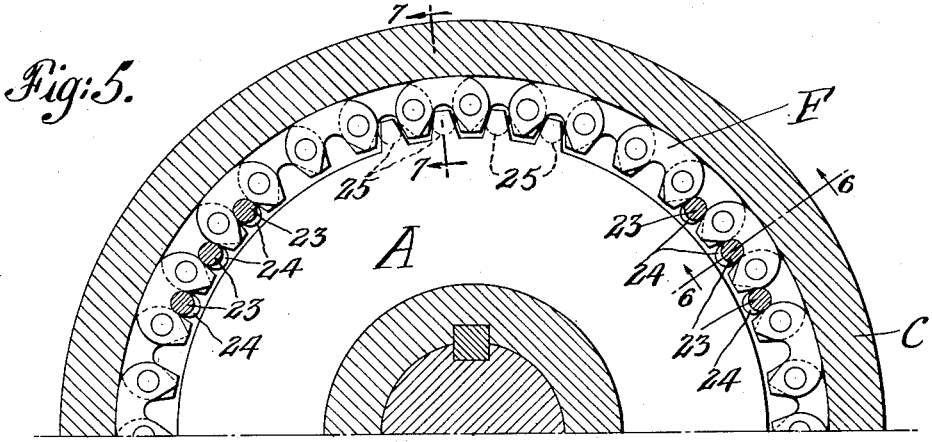
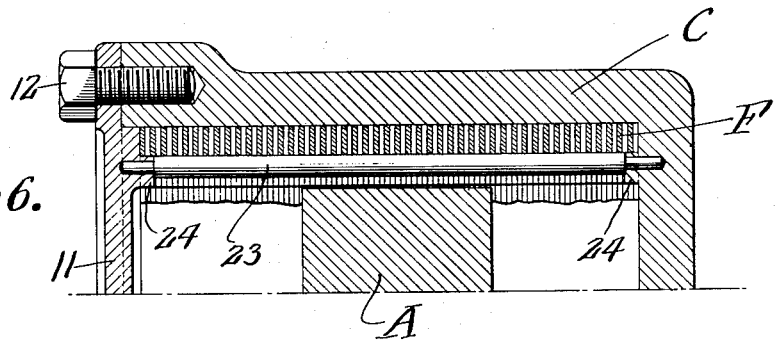
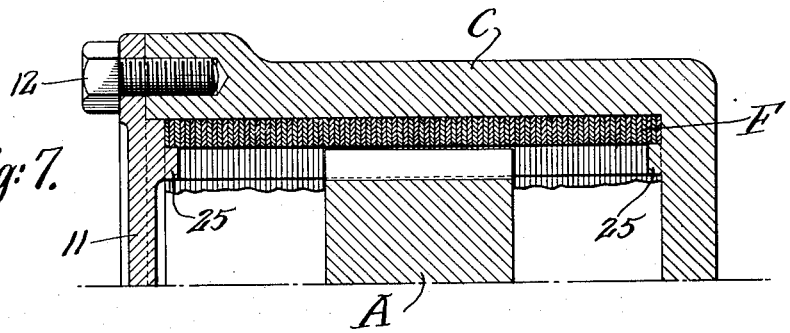
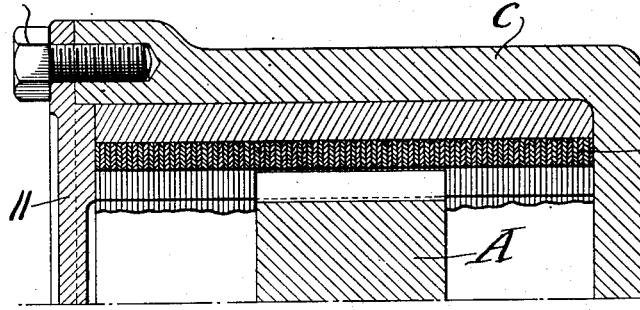

Patented Feb. 21, 1933

1,898,496

UNITED STATES PATENT OFFICE

DAVID BARNES PERRY, OF ITHACA, NEW YORK, ASSIGNOR TO MORSE CHAIN COMPANY, OF ITHACA, NEW YORK, A CORPORATION OF NEW YORK

INTERNAL-EXTERNAL FLEXIBLE COUPLING

Application filed April 26, 1930. Serial No. 447,503.

This invention relates to flexible couplings for drivingly connecting shafts or rotatable members.

One of the primary objects of my invention is the provision of a simple, inexpensive, strong and effective coupling device for shafts.

Another object of my invention is the provision of a coupling device for rotating members so constructed that end play of the members may take place without disturbing or destroying the effectiveness of the device.

A further object resides in the provision of flexible couplings for shafts peculiarly adapted to permit of endwise adjustment of the shafts while they are rotating.

A more specific object of my invention is the provision of a coupling device for shafts in which a flexible chain-like connecting element is employed, the coupling parts being arranged to prevent undue strains on the connecting element upon intentional or unintentional end movement of the shafts.

It is also an object of my invention to provide a coupling device of the character described in which the flexible connecting element is relieved from excessive tensions.

Still another object resides in the provision of a coupling device of the character described especially adapted for heavy duty service, such, for example, as is encountered in paper mill machinery.

How the foregoing, together with such other objects and advantages as may hereinafter appear, or are incident to my invention, are realized is illustrated in preferred form in the accompanying drawings, wherein—

Fig. 5 is a fragmentary sectional view illustrating a further modification of my invention.

Fig. 6 is a cross section taken substantially on the line 6—6 of Fig. 5.

Fig. 7 is a cross section taken substantially on the line 7—7 of Fig. 5.

Fig. 8 is a cross section taken through still another modification of the invention.

Figure 1:
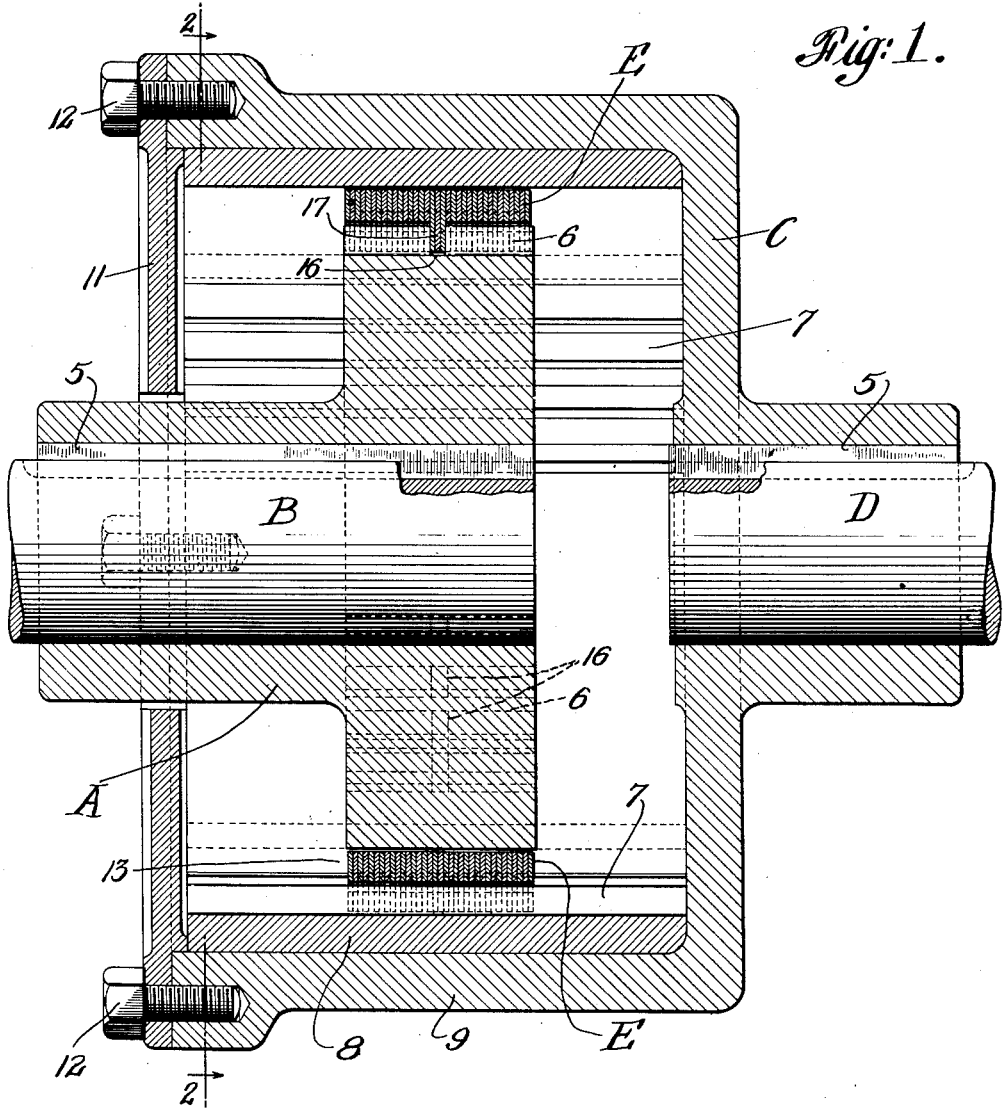
Fig. 1 is a vertical section through a coupling device constructed in accordance with my invention, the section being taken substantially on the line 1—1 of Fig. 2.

The coupling device comprises in general a coupling member A secured at the end of a shaft B, a coupling member C secured at the end of a shaft D in substantial alignment with the shaft B, and a flexible element E for connecting the members A and C. The coupling members A and C may be secured to their respective shafts as by means of keys 5.

The coupling member A is in the form of an external gear having a plurality of groups of external teeth 6, and in this instance three groups are shown, each consisting of four teeth. These groups are preferably circumferentially spaced apart a distance greater than the circumferential extent of the groups of teeth as clearly shown in Fig. 2.

The coupling member C is in the form of an internal gear having a plurality of groups of internal teeth 7 and in this instance three groups are shown, each consisting of four teeth, the circumferential spacing of which is similar to that of the teeth of the member A. The teeth 7 are preferably formed on a ring 8 adapted to fit the cylindrical portion 9 of the member C and this ring may be secured in place by means of a plurality of pins 10 (see Fig. 2). A cover member 11 may be secured to the member C by means of bolts 12.

The internally toothed portion of the member C is in surrounding relation to the member A, i. e., it encircles the member A, and is annularly spaced therefrom to provide an annular space 13 between the two members for the reception of the flexible connecting element E.

The member C by virtue of its cylindrical portion 9 being in surrounding relation to the member A and the flexible element E constitutes in effect a surrounding housing which takes the burden of centrifugal forces set up in operation and relieves the flexible element from excessive tensions tending to develop from such forces. Stated in another way, the cylindrical portion 9 prevents distention of the flexible element under the influence of centrifugal force. By transferring these stresses, so to speak, from the flexible element to the annular housing, I am enabled not only to greatly increase the horsepower that a coupling of a given size can transmit, but also the speeds at which it may be run with safety.

Figure 2:
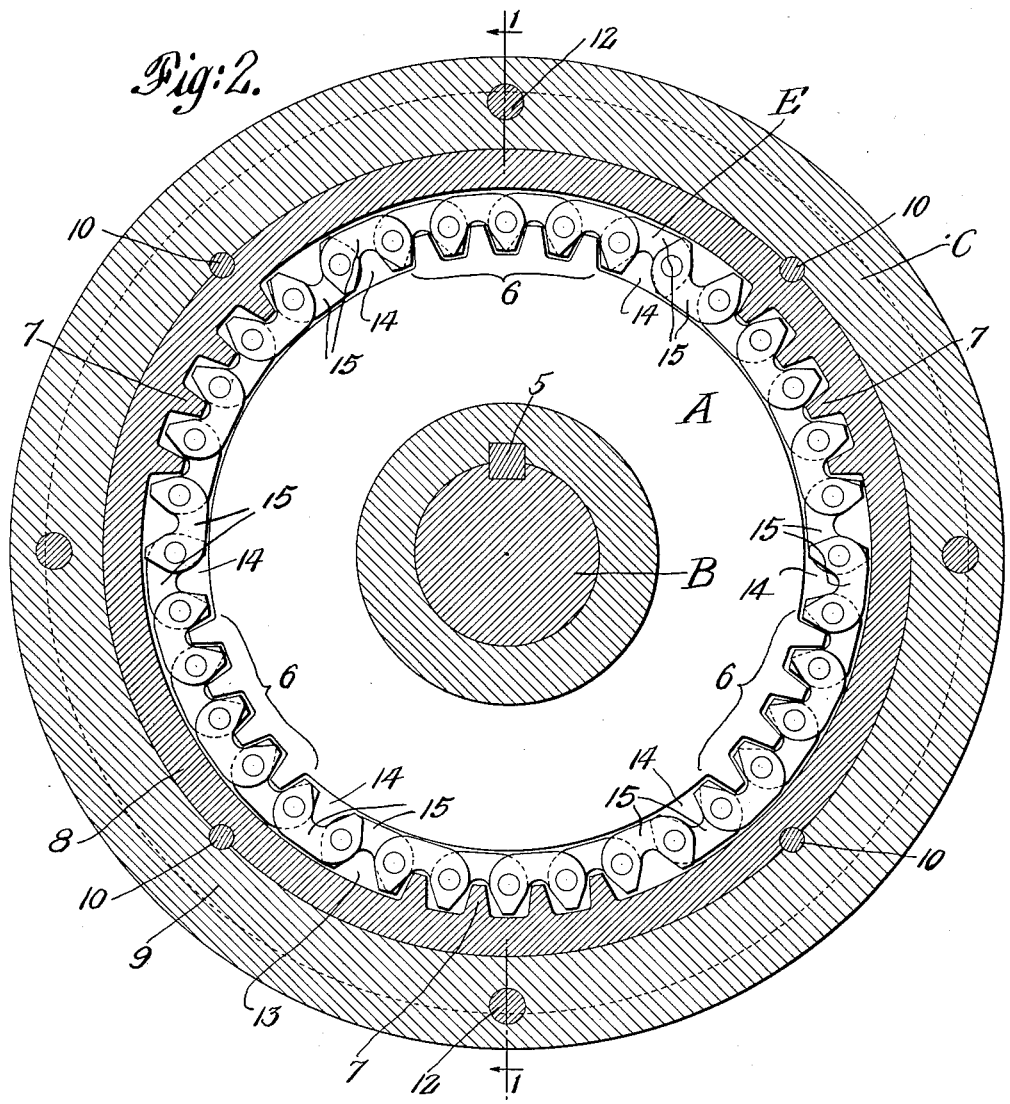
Fig. 2 is a cross section taken on the line 2—2 of Fig. 1.

The element E in the embodiment shown in Figs. 1 and 2 is in the form of an endless chain of the type commercially known as a "silent chain", i. e., the chain has pintles and links comprising a plurality of plates interspersed upon the pintles, with the plates of adjacent links, the plates being arch-shaped to fit over the teeth of the coupling members. The arch-shaped plates, however, are arranged so that the ring-like chain presents a plurality of spaced groups of internal teeth and a plurality of spaced groups of external teeth for engagement with and corresponding to the groups of external and internal teeth on the members A and C respectively.

In assembling the device the members A and C are so disposed relative to each other that the groups of teeth of one member register with the spaces between the groups of teeth of the other member. In this connection, it is pointed out that since the spaces are of greater circumferential extent than the groups of teeth, gaps 14 are provided between the groups of external teeth 6 and the groups of internal teeth 7 in which free links 15, in this instance two, are located. Thus flexibility of drive is obtained, for the drive from one coupling member to the other is through these free links.

In order to prevent the flexible element E from being displaced, the teeth of one of the coupling members, for example, the member A, are provided with grooves 16 for receiving the web or guide links 17 of the chain element.

The chain element E is preferably of the same width as the gear portion of the member A. The width of the internal ring 8, however, is substantially greater than the width of the chain by virtue of which considerable end play of the shafts with their coupling members may take place without disturbing or destroying the effectiveness of the driving connection therebetween. I have, therefore, provided a coupling device in which the shafts are free to move axially toward and away from each other a substantial distance. Referring to Fig. 2, and assuming that the shafts are moved axially away from each other, it will be seen that the chain E will move with the member A and that the links of the chain will remain in full contact with the internal teeth of the member C throughout the movement, it being understood, of course, that the amount of possible endwise movement is determined by the width of the internal member. It will be apparent that through this arrangement all of the plates of the links remain in tooth contact and, therefore, the pintles are   subject to undue strains when endwise movement takes place and as would be the case if the chain rode off of the internal teeth in endwise movement, for under such conditions the pintles would tend to shear off.

Through the practice of my invention a coupling is provided which may be employed in machinery where endwise adjustment of the shafts in service is desirable. Such adjustments may be made while the shafts are rotating and it will be clear from the foregoing that the driving connection will be just as effective in one position of adjustment as in another. Because of these advantages the coupling is particularly adapted to stand up under heavy loads.

Figure 3:
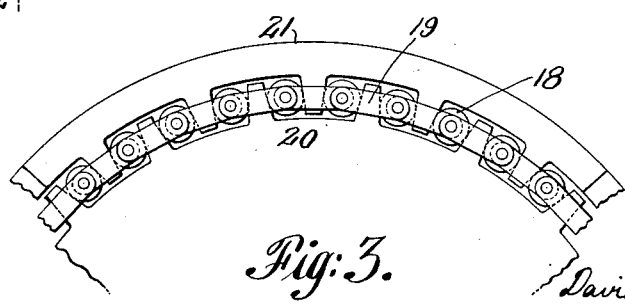
Figs. 3 and 4 are fragmentary views of modifications of the invention.

In Fig. 3 I have illustrated a modification of the invention in which the flexible element is in the form of a roller type of chain 18. The advantages above mentioned are also to be obtained in this modified construction, although in less degree because of limitations in end play imposed by the side links 19 of the chain. In this modification I have shown the teeth of the members 20 and 21 relatively widely spaced apart so that the teeth of one coupling member registers with the spaces between the teeth of the other member, with the rollers of the chain located between teeth. In order to facilitate assembly of the device the internal gear ring 21 may be made in sections as indicated.

Figure 4:
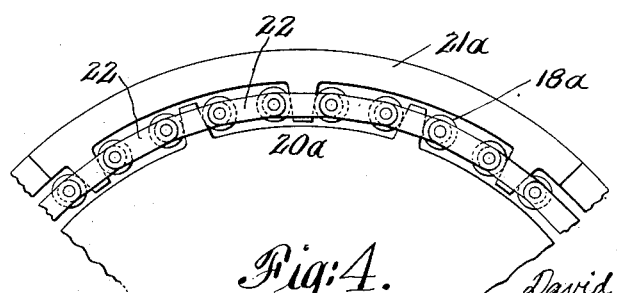

The modification illustrated in Fig. 4 is somewhat similar to that of Fig. 3. The teeth of the members 20a and 21a, however, are more widely spaced apart so that free links 22 of the chain 18a are located between the teeth.

While I have shown the flexible element E in Figs. 1 and 2 as composed of alternately reversed groups of arch-shaped links, I also contemplate employing chains of the type having teeth at both faces.

It is also to be understood that I contemplate making the externally toothed member the wide member and the internally toothed member the narrow member, in which case the chain element would be fixed to the internally toothed member.

Referring to Figs. 5, 6 and 7, I have shown therein a further modification of the invention in which I employ a flexible connecting element or chain F extending substantially across the full width of the coupling member C. In this instance, however, the member C is not provided with internal teeth. The flexible chain F is positioned in the member C as by means of a plurality of pins 23 arranged in circumferentially spaced groups. Additional positioning means for the flexible chain F is provided in the form of lugs 24 associated with the pins 23 and a plurality of other lugs 25 clearly shown in Figs. 5 and 7.

It is to be understood, of course, that the pins alone or the lugs 25 alone may be employed in some instances.

In the form just described and also in the form illustrated in Fig. 8, the guide links of Fig. 1 are not employed. The coupling member A is preferably of the same form as that shown in Fig. 1 with the groove 16 omitted.

Fig. 8 illustrates a modification in which the coupling members A and C and the internally toothed ring 8 are of similar construction to those of the form shown in Fig. 1. This modification differs, however, in that the flexible chain F extends for substantially the full width of the member C and is not keyed to the element A. Thus, when end play takes place, the element A moves along the chain F.

In addition to the coupling device effectively taking care of end play and adjustment, it will also, by virtue of its flexibility, take care of slight misalignments of the shafts.

I claim:—

1. A driving connection for two rotatable members comprising in combination a coupling member secured at the end of each rotatable member, one of said coupling members having internal teeth and the other external teeth, and a chain connecting the coupling members and engaging the teeth thereof.

2. A driving connection for two rotatable members comprising in combination a coupling member secured at the end of each rotatable member, one of said coupling members having internal teeth and the other external teeth, and a chain connecting the coupling members, said chain having toothed links engaging the teeth of said members.

3. A driving connection for two rotatable members comprising in combination a coupling member secured at the end of each rotatable member, one of said coupling members having internal teeth and the other external teeth, and an endless chain between the coupling members having internal engagement with the coupling member having the external teeth and external engagement with the coupling member having the internal teeth.

4. A driving connection for two rotatable members comprising in combination a coupling member secured at the end of each rotatable member, one of said coupling members having internal teeth and the other external teeth, said chain having teeth on opposite faces and the teeth on one face being adapted to engage the externally toothed coupling member and the teeth on the other face being adapted to engage the internally toothed coupling member.

5. A driving connection for two rotatable members comprising in combination a coupling member secured at the end of one rotatable member having circumferentially spaced groups of external teeth, a coupling member secured at the end of the other rotatable member having circumferentially spaced groups of internal teeth, said coupling members being so relatively located that the groups of teeth of one register with the spaces between the groups of teeth of the other, and a flexible element connecting the coupling members through the medium of the teeth.

6. A flexible coupling for rotatable members comprising a coupling member fixed to the end of one rotatable member having external teeth, a coupling member fixed to the end of the other rotatable member having an internally toothed portion encircling the externally toothed coupling member of the first rotatable member, the toothed portions of said coupling members being annularly spaced apart, and a flexible chain in said space engaging the teeth of the coupling members and forming a driving connection therebetween.

7. A flexible coupling for rotatable members comprising an external gear, a flexible chain wrapped therearound, and an internal gear surrounding the external gear and chain, said chain having toothed links engaging the external and internal gears.

8. A flexible driving connection for two rotatable members comprising an external gear secured at the end of one rotatable member, a flexible chain wrapped around said gear, means for retaining the chain against displacement from the external gear, an internal gear secured at the end of the other rotatable member and extending in surrounding relation to the external gear and chain, said chain having links with teeth for engaging the external gear and links with teeth for engaging the internal gear and said internal gear being of greater width than the external gear and chain.

9. A flexible driving connection for two rotatable members comprising an external gear secured at the end of one rotatable member, an internal gear secured at the end of the other rotatable member, said internal gear being in surrounding and annularly spaced relation to the external gear, an internally and externally toothed endless chain located in the annular space between said gears and engaging the gear teeth thereof to provide a driving connection between the gears, and means fixing the chain to one of the gears, the other gear being of greater width than the gear to which the chain is fixed whereby relative axial movement of the rotatable members may take place without disturbing the effectiveness of the driving connection.

10. A flexible driving connection for two rotatable members comprising circumferentially spaced groups of external teeth at the end of one of the rotatable members, circumferentially spaced groups of internal teeth at the end of the other rotatable member and extending in surrounding relation to the external teeth with an annular space therebetween, and a flexible member for connecting the rotatable members comprising an endless chain located in the annular space, said chain having arched link plates arranged to provide circumferentially spaced groups of internal teeth for mesh with the aforesaid external teeth and circumferentially spaced groups of external teeth for mesh with the first mentioned internal teeth.

11. A driving connection for two rotatable members comprising in combination, a coupling member secured at the end of each rotatable member, one of said coupling members having a cylindrical portion with internal teeth and the other having external teeth, and a chain connecting said coupling members and engaging the teeth thereof, said cylindrical portion being in close surrounding relation to the chain and adapted to relieve the chain of tensions created by centrifugal force.

12. A flexible coupling for rotatable members comprising an external gear, a flexible chain wrapped therearound, and an internal gear surrounding the external gear and chain, said chain having toothed links engaging the external and internal gears, and the internal gear constituting a housing for the chain adapted to take the burden of centrifugal forces set up in operation.

13. A flexible coupling for two rotatable members comprising in combination, a coupling member secured at the end of each rotatable member and a chain connecting said coupling members, one of said coupling members having a cylindrical portion encircling and housing the chain and adapted to prevent distention of the chain under the influence of centrifugal force.

14. A driving connection for two rotatable members comprising in combination, a coupling member secured to each rotatable member, one of said coupling members having a portion in surrounding and annularly spaced relation to the other coupling member, an endless chain in said annular space forming a driving connection between the coupling members, means for securing said chain to one of the coupling members, and interengaging means between the chain and the other coupling member.

15. A driving connection for two rotatable members comprising in combination, a coupling member secured to each rotatable member, one of said coupling members having a portion encircling and enclosing the other coupling member, a chain carried in said encircling portion, and interengaging means between said chain and said encircling portion and between said chain and the other coupling member.

16. A driving connection for two rotatable members comprising in combination, a coupling member secured to each rotatable member, one of said coupling members having a portion encircling and enclosing the other coupling member, an endless chain carried in said encircling portion, means for securing said chain in said encircling portion against rotation, and means affording a driving connection between the other coupling member and the chain.

17. A driving connection for two rotatable members comprising in combination, a coupling member secured to each rotatable member, one of said coupling members having a portion in surrounding and annularly spaced relation to the other coupling member, an endless chain in said annular space, means carried by one of the coupling members for engaging the chain at circumferentially spaced points, and means carried by the other coupling member for engaging the chain at circumferentially spaced points, the engaging means of one coupling member being so relatively disposed to the engaging means of the other coupling member that different links of the chain are engaged by each.

In testimony whereof I have hereunto signed my name.

DAVID BARNES PERRY.